# (12) United States Patent
Lalonde et al.

(10) Patent No.: US 8,589,350 B1
(45) Date of Patent: Nov. 19, 2013

(54) SYSTEMS, METHODS, AND MEDIA FOR SYNTHESIZING VIEWS OF FILE SYSTEM BACKUPS

(75) Inventors: Eric Lalonde, Santa Clara, CA (US); Vito Caputo, Wheaton, IL (US)

(73) Assignee: Axcient, Inc., Mountain View, CA (US)

( * ) Notice: Subject to any disclaimer, the term of this patent is extended or adjusted under 35 U.S.C. 154(b) by 0 days.

(21) Appl. No.: 13/437,738

(22) Filed: Apr. 2, 2012

(51) Int. Cl.
 *G06F 17/30* (2006.01)
(52) U.S. Cl.
 USPC ......................................................... 707/639
(58) Field of Classification Search
 USPC ........... 707/101, 200, 204, 604, 639; 711/162
 See application file for complete search history.

(56) References Cited

U.S. PATENT DOCUMENTS

| | | | |
|---|---|---|---|
| 6,233,589 B1 | 5/2001 | Balcha et al. | |
| 6,604,236 B1 | 8/2003 | Draper et al. | |
| 7,085,904 B2 | 8/2006 | Mizuno et al. | |
| 7,266,655 B1 * | 9/2007 | Escabi et al. | 711/162 |
| 7,401,192 B2 | 7/2008 | Stakutis et al. | |
| 7,406,488 B2 | 7/2008 | Stager et al. | |
| 7,620,765 B1 | 11/2009 | Ohr et al. | |
| 7,797,582 B1 | 9/2010 | Stager et al. | |
| 7,844,850 B2 | 11/2010 | Yasuzato | |
| 7,873,601 B1 | 1/2011 | Kushwah | |
| 8,037,345 B1 | 10/2011 | Iyer et al. | |
| 8,099,572 B1 | 1/2012 | Arora et al. | |
| 8,117,163 B2 * | 2/2012 | Brown et al. | 707/640 |
| 8,407,190 B2 | 3/2013 | Prahlad et al. | |
| 2002/0169740 A1 | 11/2002 | Korn | |
| 2003/0158873 A1 | 8/2003 | Sawdon et al. | |
| 2005/0027748 A1 | 2/2005 | Kisley | |
| 2005/0171979 A1 | 8/2005 | Stager et al. | |
| 2006/0064416 A1 | 3/2006 | Sim-Tang | |
| 2006/0224636 A1 | 10/2006 | Kathuria et al. | |
| 2007/0112895 A1 | 5/2007 | Ahrens et al. | |
| 2007/0208918 A1 | 9/2007 | Harbin et al. | |
| 2007/0220029 A1 * | 9/2007 | Jones et al. | 707/101 |
| 2007/0288525 A1 * | 12/2007 | Stakutis et al. | 707/200 |
| 2007/0288533 A1 | 12/2007 | Srivastava et al. | |
| 2007/0294321 A1 | 12/2007 | Midgley et al. | |
| 2008/0010422 A1 | 1/2008 | Suzuki et al. | |
| 2008/0027998 A1 | 1/2008 | Hara | |
| 2008/0082310 A1 | 4/2008 | Sandorfi et al. | |
| 2008/0162590 A1 | 7/2008 | Kundu et al. | |
| 2008/0162607 A1 * | 7/2008 | Torii et al. | 707/204 |
| 2008/0307527 A1 * | 12/2008 | Kaczmarski et al. | 726/24 |
| 2009/0164527 A1 * | 6/2009 | Spektor et al. | 707/204 |
| 2010/0077165 A1 | 3/2010 | Lu et al. | |
| 2010/0104105 A1 * | 4/2010 | Schmidt et al. | 380/283 |
| 2011/0082998 A1 | 4/2011 | Boldy et al. | |
| 2011/0218966 A1 | 9/2011 | Barnes et al. | |
| 2012/0130956 A1 | 5/2012 | Caputo | |

OTHER PUBLICATIONS

Non-Final, Apr. 30, 2013, U.S. Appl. No. 13/363,234, filed Jan. 31, 2012.
Final, Dec. 27, 2012, U.S. Appl. No. 12/895,275, filed Sep. 30, 2010.

* cited by examiner

*Primary Examiner* — Etienne Leroux
(74) *Attorney, Agent, or Firm* — Carr & Ferrell LLP

(57) ABSTRACT

Systems, methods, and media for synthesizing a view of a file system are provided herein. Methods may include receiving a request to obtain a view of at least a portion of a file system backup for a device, responsive to the request, mounting one or more backup files for the device on a backup node, generating a view of the at least a portion of a file system created from the one or more mounted backup files, the view being accessible via the intermediary node that is communicatively coupled with the backup node.

22 Claims, 6 Drawing Sheets

SYSTEMS, METHODS, AND MEDIA FOR SYNTHESIZING VIEWS OF FILE SYSTEM BACKUPS

CROSS-REFERENCE TO RELATED APPLICATIONS

This non-provisional patent application is related to U.S. patent application Ser. No. 12/895,275, filed on Sep. 30, 2010, entitled "Systems and Methods for Restoring a File" and U.S. patent application Ser. No. 13/030,073, filed on Feb. 17, 2011, entitled "Systems and Methods for Maintaining a Virtual Failover Volume of a Target Computing System"—all of which are hereby incorporated by reference herein in their entirety.

FIELD OF THE TECHNOLOGY

Embodiments of the disclosure relate to systems and methods that facilitate interaction with backup file structures.

BACKGROUND OF THE DISCLOSURE

Remote backup systems often comprise snapshots and incremental files that are generated for a target source such as a database or other digital storage media. These files may be backed up to a cloud-based storage environment and may be accessed upon the occurrence of a failure event. Unfortunately, system administrators may be unable to determine the content included in the snapshots or incremental files, the difference between snapshots, or other pertinent information, and may therefore be unable to readily determine an appropriate backup to access for recovering a particular machine state or application. Restoration of file system backups are an expensive and time-consuming process, and indiscriminate restoration only increases such deleterious effects.

SUMMARY OF THE DISCLOSURE

According to some embodiments, the present technology may be directed to methods for synthesizing a view of at least a portion of a file system backup. The methods may include: (a) receiving a request to obtain a view of at least a portion of a file system backup for a device; (b) responsive to the request, mounting one or more backup files for the device on a backup node to; (i) generate a view of the at least a portion of a file system created from the one or more mounted backup files; and (ii) expose the view to an intermediary node that is communicatively coupled with the backup node.

According to other embodiments, the present technology may be directed to systems for synthesizing a view of at least a portion of a file system backup. These systems may include: (a) a backup node that comprises: (i) a memory for storing executable instructions that synthesize a view of at least a portion of a file system backup; (ii) a processor that executes the instructions; (iii) a communications module that receives a request to view a representation of at least a portion of a file system backup for a device at an arbitrary point in time; (iv) a view generator that: (1) mounts one or more backup files for the device; and (2) generates a view of the at least a portion of a file system created from the one or more mounted backup files; and (b) an intermediary node communicatively coupled with the backup node, the intermediary node providing, to a network browser, a user interface that includes the view.

According to additional embodiments, the present technology may be directed to computer readable storage media for synthesizing a view of at least a portion of a file system backup. The storage media may include a program embodied thereon, the program being executable by a processor to perform a method for synthesizing a view of at least a portion of a file system backup. The methods may include: (a) receiving a request to obtain a view of at least a portion of a file system backup for a device; (b) responsive to the request, mounting one or more backup files for the device on a backup node; (c) generating a view of the at least a portion of a file system created from the one or more mounted backup files; and (d) exposing the view to an intermediary node that is communicatively coupled with the backup node.

According to some embodiments, the present technology may be directed to methods for generating a view of a file system backup. The methods may include: (a) authenticating an end user via credentials received via a user interface; (b) receiving a device identification for a device; (c) locating restore points for the device and providing indications of the restore points via the user interface; (d) receiving selections of one or more restore points via the user interface; (e) mounting the one or more restore points on a backup node to generate a view of a file system; (f) exposing the view of the file system to an intermediary device; and (g) providing the view of the file system exposed on the intermediary device via the user interface.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
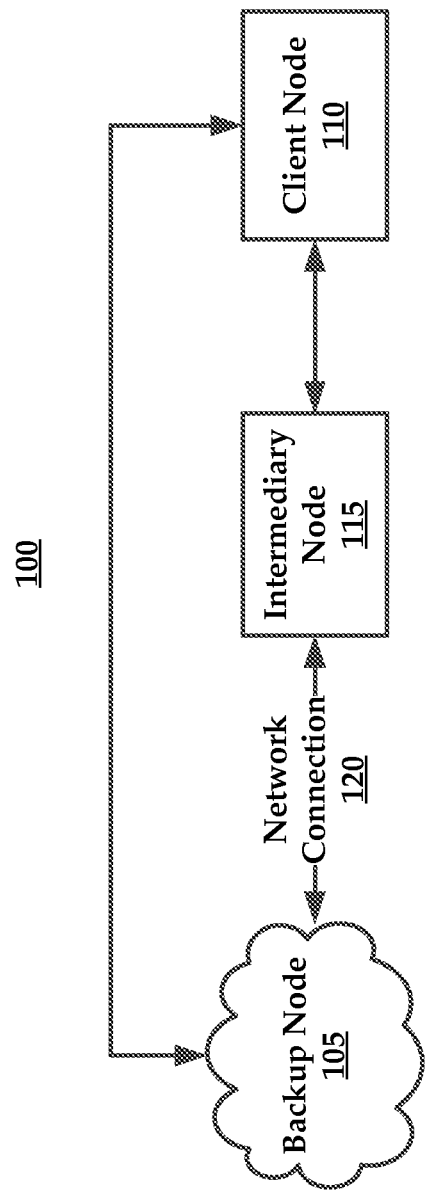
FIG. 1 illustrates an exemplary system for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology generates or synthesizes views of file system backups. That is, the present technology generates a browsable or explorable representation of a backed up file system that allows end users to visually inspect file system backups that reside either locally or within a cloud-based remote storage environment. This is particularly useful for allowing end users to verify the content of their backup files.

Systems and methods provided herein may expose the content of a file system backup to an intermediary node by generating representations (e.g., views) of the file system backup. These representations or views of the file system backups may be interacted with similarly to a file system of a local disk.

End users may "backup" a particular device or group of devices according to a backup schedule. The backup process for a device may include taking snapshots of the file system of the device according to the backup schedule. Additionally, the backup may include incremental files that represent changes to files of the file system that occur between snapshots.

Therefore, the terms "file system backup" may include, but are not limited to, snapshots or mirrors taken of a file structure at particular points in time, along with incremental files that include changes in files included in the file structure occurring between snapshots. The file system backup may also include metadata that correspond to the snapshots, incremental files, and information regarding the device that the file structure resides on and the backup preferences for the device established by the device end user.

The file system backups may be stored on a backup node, which may include a storage media. The backup node may include individually configured machines, distributed computing resources, cloud-based remote storage resources, and/or combinations thereof.

Views may be generated on a backup node by exposing the file system backups to a file system in userspace (UFSE) module. The security of the file system backups may be maintained by exposing the views to an intermediary node over a secure connection, before providing authenticated client nodes the views via a graphical user interface.

It will be understood that the client nodes may interact with the views similarly to their local file system inasmuch as the client nodes may browse attributes of files, search filenames, sort files, and any other typical interactions with local file systems.

Additionally, end users may save storage on the backup node, or locally by reviewing and deleting file system backups (e.g., restore points) that are determined to be of little value. For example, a brief review of a view of a plurality of file system backups for a device may illustrate that a particular disk, folder, or file is relatively unchanged. Therefore, certain backups may be deleted to save storage space in a process referred to as compaction. Compaction may occur manually or automatically according to thresholds established by end users. For example, the end user may establish that a certain percentage of change must occur between snapshots to justify continued storage of a previous snapshot.

The present technology may process incremental files such as reverse incremental delta increments, along with other reverse differential backup functionalities such as methods for restoring a file or disk as described in U.S. patent application Ser. No. 12/895,275, filed on Sep. 30, 2010, entitled "Systems and Methods for Restoring a File"—which is hereby incorporated by reference herein in its entirety.

FIG. 1 illustrates an exemplary system 100 for practicing aspects of the present technology. The system 100 may include a backup node 105 that receives file system backup data from a plurality of client nodes, such as client node 110. The backup node 105 may include an individual server that includes a storage media, while in other embodiments the backup node 105 may include a cloud-based computing environment that is configured to store file system backups received from the client node 110.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

To increase protection and integrity of the file system backups stored in the backup node, the system 100 may also include an intermediary node 115 disposed between the backup node 105 and the client node 110. The intermediary node 115 may be communicatively couplable with the backup node 105 via a network connection 120. The network connection 120 may include any one of a number of public or private communications mediums, although in one embodiment, the network connection 120 may employ a secure protocol that encrypts data transmitted between the backup node 105 and the intermediary node 115.

Additionally, the client node 110 may interact with the intermediary node 115 via any one of a number of authentication methods, for example, a private/public key pair, or any other means of authentication that would be known to one of ordinary skill in the art with the present disclosure before them, such as a username and password.

In some embodiments, the backup node 105 may expose views of a backed up file system to the intermediary node 115, rather than exposing the views directly to the client node 110. The exposing of the view to the intermediary node 115 may preserve the integrity of the file system backup by preventing direct access to the file system backups. In short, the intermediary node 115 limits access to the data stored on the backup node 105.

Figure 2:
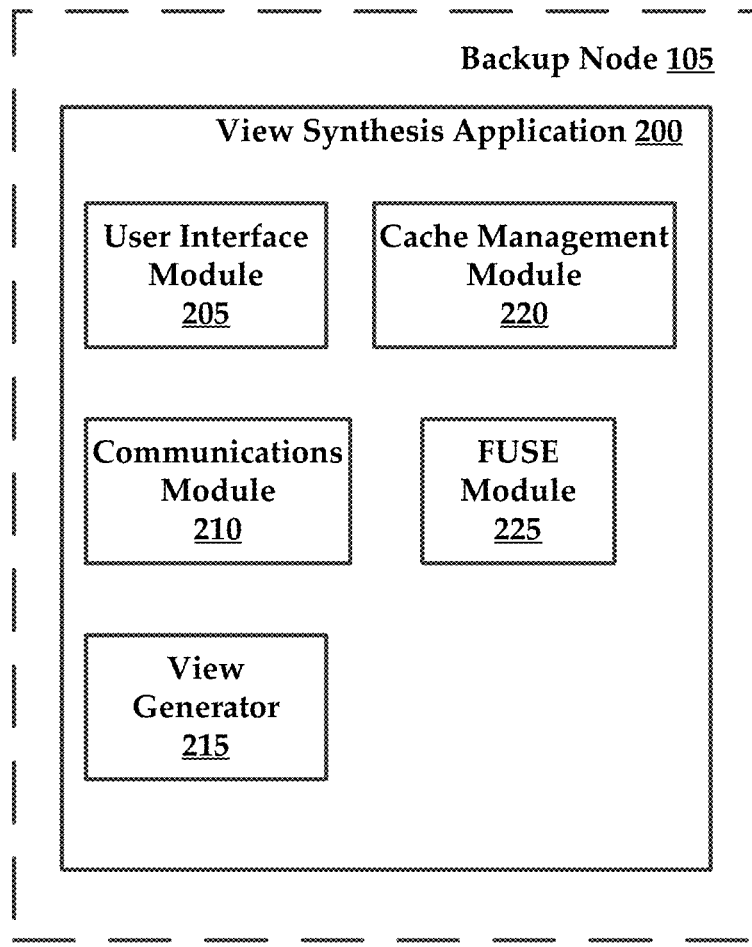
FIG. 2 shows an exemplary view synthesis application.

Referring now to FIG. 2, according to some embodiments, the backup node 105 may include a view synthesis application 200 (hereinafter application 200) that generates views of a file system backup for a device. Therefore, the system 100 functions as a particular purpose computing system that generates views of file system backups that are exposed to an intermediary device.

The application 200 may include a user interface module 205, a communications module 210, a view generator 215, and a cache management module 220. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured web servers.

Subsequent to the generation of file system backups as described above, the user interface module 205 may be executed to generate a graphical user interface (GUI) that provides a mechanism by which end users may interact with the application 200 to obtain views of file system backups stored in the backup node 105. As mentioned above, the GUI may include mechanisms that allow end users to provide authenticating information for gaining access to the application 200. The GUI may also allow end users to specify the desired file system backups for which they wish to obtain views. Information that indicates a desired file system backup may include device identification information, a selection of a desired resource such as a particular disk, and in some embodiments the end user may specify a desired file system backup version. That is, the end user may already know the backup file that they wish to obtain.

The specific instructional details for obtaining a view of a file system may be referred to as a request to obtain a view of at least a portion of a file system backup for a device. Prior to generating the request, an end user may obtain a list of previously generated backup jobs (e.g., snapshots, mirrors, restore points) that exist on a local or remote backup system. The list of backup jobs may be presented to the end user. The end user may select which backup job for which they desire to generate a view. In some embodiments, a backup job may be referred to as a payload.

The view generator 215 may also generate a payload view. The payload view may include at least a portion of the available restore points for the end user. The payload for a restore point may be at least partially defined by metadata that describes the restore point, such as device information, operating system version, device address information, along with backup schedule data that describes the backup interval, along with any backup constraints (e.g., which files are actually backed up) selected by the end user.

As overview, once the end user has selected the desired backup job (e.g., payload), the present technology may mount the restore point on a backup node. The mounting of the restore point generates a view that is browsable via an intermediary node. The intermediary node communicates with the backup node over a secure communications path to allow the end user to browse the restore point as an emulated file system.

Once mounted, end users may conduct a deep-level inspection of various paths and files in the backup data and/or request to transfer specific files to their client node 110, or other actions relative to the mounted restore point. It is noteworthy that the request for information may be passed from the intermediary node to the backup node over a secure protocol, serviced by the file system emulation software (UFSE), and rendered by the view generator for presentation to the user.

In some embodiments, the view may be of a file system at a particular or arbitrary point in time. That is, the view may represent the state of the file system of the device at a particular point in time. Therefore, if the desired point in time does not correspond to a snapshot, it will be understood that the present technology may generate the view of the file system by exposing a snapshot along with one or more incremental or delta files.

Once a payload has been selected, the request for the payload is provided to the communications module 210. It will be understood that the communications module 210 may also transmit the view of the file system backup to the intermediary node 115.

Figure 3:
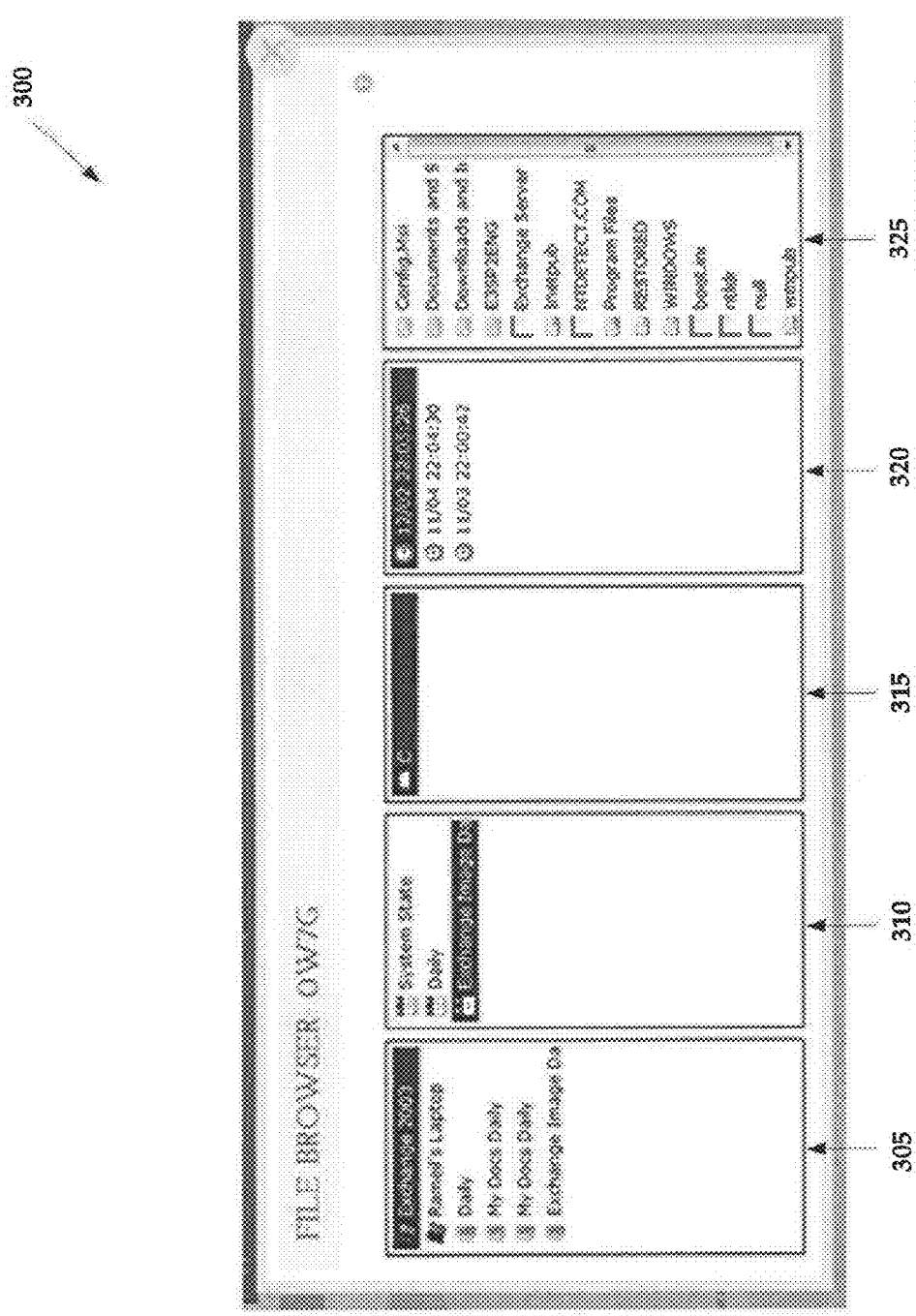
FIG. 3 shows an exemplary graphical user interface that includes a view of a portion of a file system backup.

Using the selected payload, a userspace file system simulation emulation UFSE module 225 may select the appropriate restore point(s) on the backup node, based upon the payload request. The UFSE module 225 may mount the backup file(s) on the backup node and provide access to the mounted backup files. An exemplary view of a restore point is illustrated in FIG. 3.

According to some embodiments, the view may include differential trees of data that include individual folders and files. The representations of the backup files may be structured as hierarchical trees, where each restore point represents a differential or a snapshot of a file system at the file level.

The view that is generated by the UFSE module 225 may resemble a local disk. That is, end users may interact with the view similarly to a local file system on their client node 110. Therefore, the end user may browse the file system, search for filenames, or otherwise interact with the view. As such, the view may not only contain representations (such as images) of the files, folders, and their respective hierarchical relationships (e.g., disk/folder/file relationships), but the view may also contain descriptive information for each item that is gathered from the metadata associated with the file system backups. For example, the metadata associated with a file may include size, creation date, last modification date, version, and so forth. Metadata for files, disks, or other file system data may also be obtained.

To optimize the present technology, the cache management module 220 may be executed to maintain (e.g., store and query) previously generated views of a file system backups. The cache management module 220 may receive views generated by the view generator 215 and store the same in temporary cache memory on the backup node 105. In some embodiments, before a view for a file system backup is generated, the cache management module 220 may be executed to query the cache memory for a view of the file system backup before the generation of a view of the file system backup. That is, if a restore point has already been mounted to the backup node by the UFSE module 225, it would be unnecessary to remount the backup node. Therefore, requests for an already mounted backup node may be fulfilled by providing the view of the mounted backup, rather than re-exposing the restore point with the UFSE module 225. The cache management module 220 may routinely purge views after a predetermined period of time, which in some instances, may be related to the backup schedule for the device.

FIG. 3 illustrates an exemplary graphical user interface (GUI 300) includes a view of a portion of a file system backup. The GUI 300 is shown as a comprising a plurality of frames. The first frame 305 includes a selectable list of devices for which file system backups may be viewed. In this example, a device entitled "Exchange 2003" is shown as selected. The selection of the device in the first frame 305 provides additional selections in a second frame 310 that represent different backup plans for the selected device. Upon selection of a desired backup plan, the third frame 315 may be populated with selections for a desired disk from the device. In this case, the only disk available includes the root disk "C" for the device, although in other embodiments, the device may include multiple disks. Selection of the desired disk may then populate a fourth frame 320 with a selectable list of available restore points (e.g., snapshots) for the disk. These restore points correspond to snapshots taken of the disk at previous points in time.

Selection of the restore point may then populate a fifth frame 325 with a view of the file system for the disk at a given point in time. The view is shown as including both folder and files resident on the disk at the given point in time.

One of ordinary skill in the art will appreciate that many variations of the GUI 300 may be contemplated and utilized in accordance with the present technology. That is, the GUI is merely an exemplary representation of one type of GUI that may be generated by the present technology, but other views generated by the present technology may depend on the particularities of the device itself and the file system(s) of the device.

Figure 4:
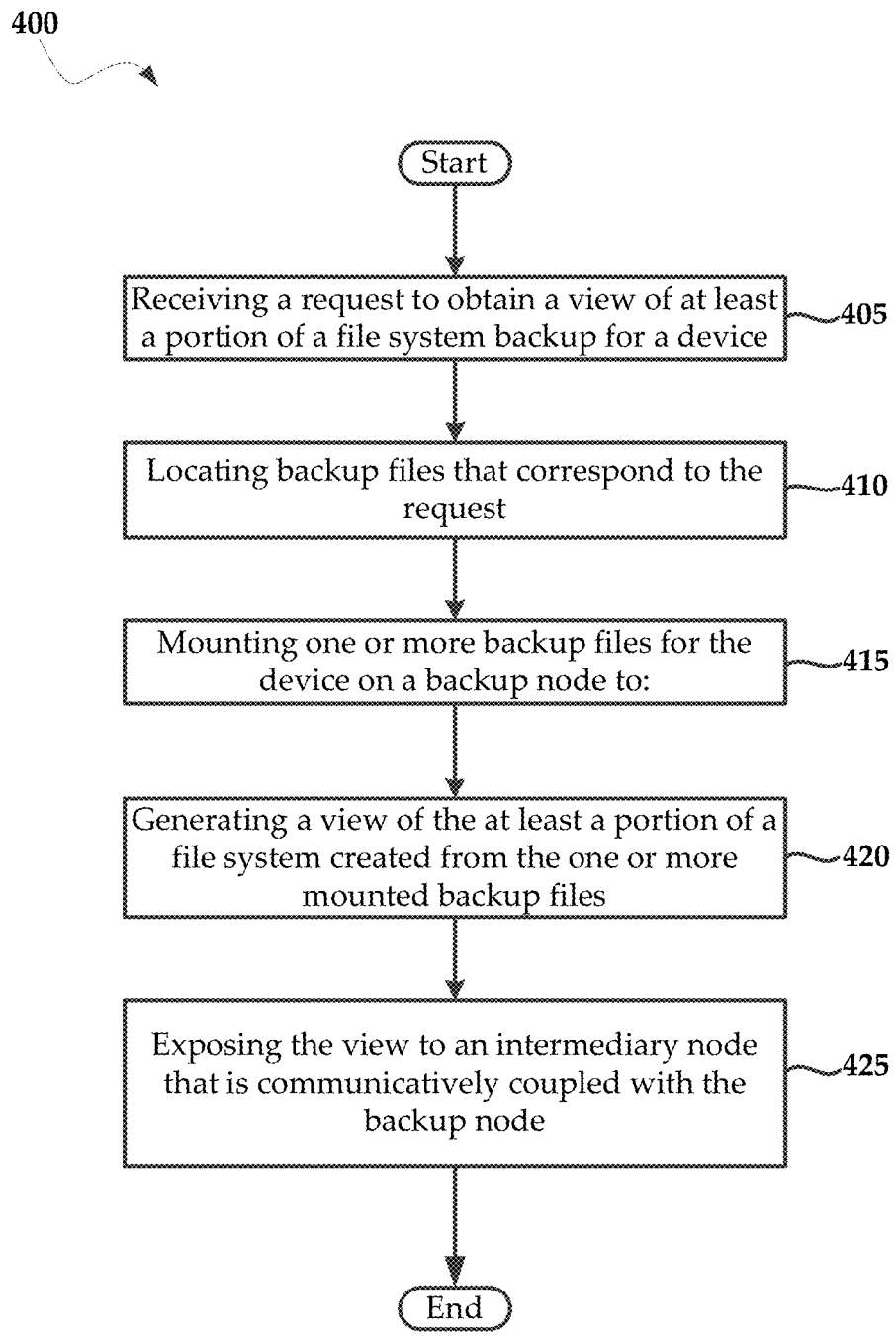
FIG. 4 is a flowchart of an exemplary method for synthesizing a view of at least a portion of a file system backup.

FIG. 4 illustrates a flowchart of an exemplary method 400 for synthesizing a view of at least a portion of a file system backup. The method may include a step 405 of receiving a request to obtain a view of at least a portion of a file system backup for a device. The request may be received via a GUI, as described above. The request may specify the desired device, disk, folder, or individual file for which the end user is interested in obtaining a view from a file system backup.

Responsive to the request, the method may include a step 410 of obtaining or locating backup files that correspond to the request. It is noteworthy to mention that the backup files may be stored on a backup node that includes a cloud-computing environment.

Once the backup files have been obtained or identified, the method may include a step 415 of mounting one or more backup files for the device on a backup node. After the backup files have been mounted to the backup node, the method may include a step 420 of generating a view of the at least a portion of a file system created from the one or more mounted backup files.

Finally, the method may include a step 425 of exposing the view to an intermediary node that is communicatively coupled with the backup node.

It is noteworthy that client nodes may access the exposed view by interacting with the intermediary device, rather than interacting with the backup node. As such, the security and integrity of the data stored on the backup node may be maintained.

Figure 5:
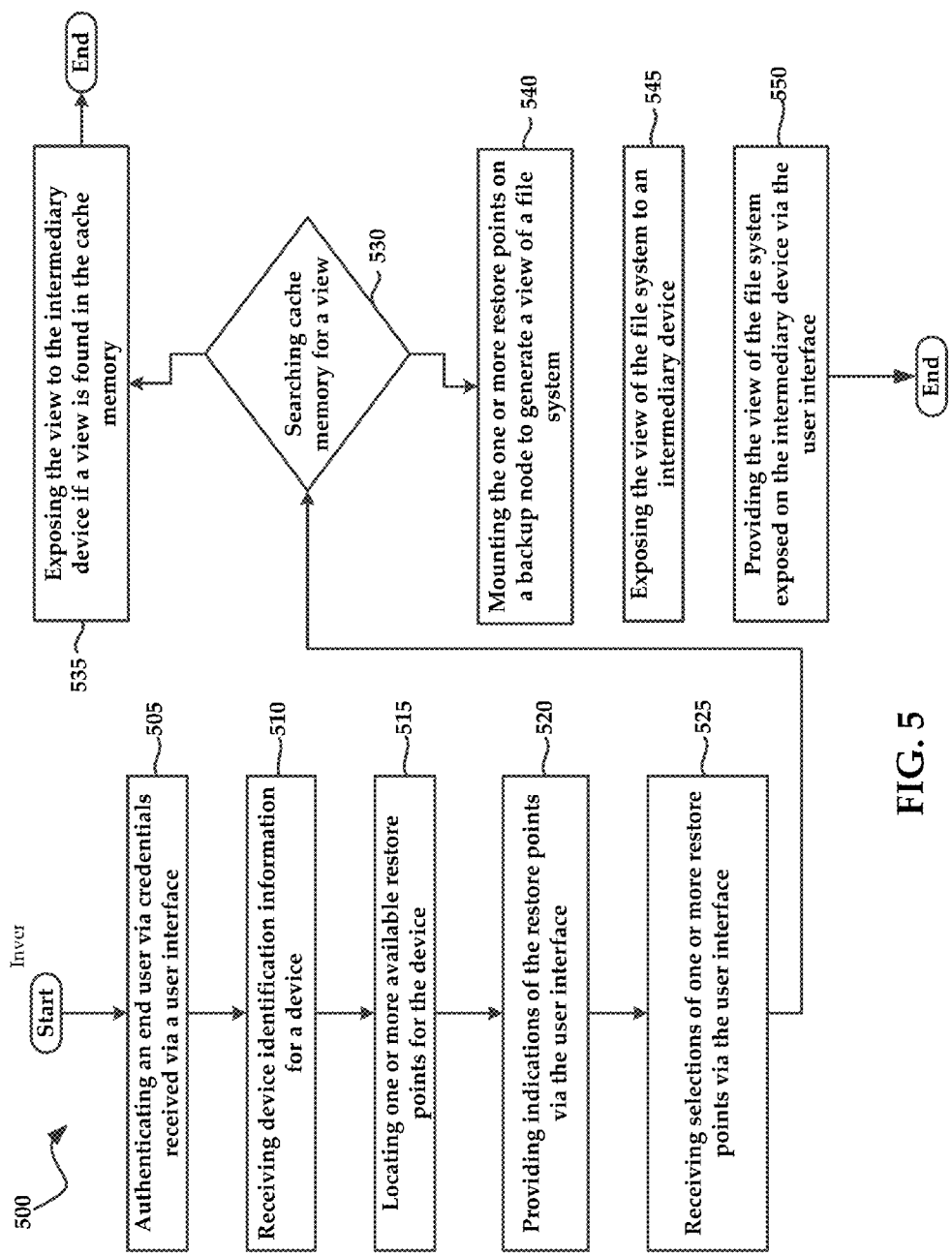
FIG. 5 is a flowchart of an exemplary method for generating a view of a file system backup.

FIG. 5 illustrates a flowchart of an exemplary method 500 for generating a view of a file system backup. The method may include a step 505 of authenticating an end user via credentials received via a user interface. The credentials may include a private/public key pairing, a username and password combination, or any other authentication means that would be known to one of ordinary skill in the art.

The method may include a step 510 of receiving device identification information for a device, before a step 515 of locating one or more available restore points for the device and a step 520 of providing indications of the restore points via the user interface. Next, in step 525 selections are received for one or more restore points via the user interface.

Once a restore point has been selected, the method may include an optional step 530 of searching cache memory for a view that corresponds to the identifying information received. That is, in some instances, a view of a particular device may be stored in cache memory. If a view exists in the cache memory, the method may include a step 535 of exposing the view to the intermediary device if a view is found in the cache memory. If no view exists in the cache memory, the method may proceed to a step 540 of mounting the one or more restore points on a backup node to generate a view of a file system.

The method may then include a step 545 of exposing the view of the file system to an intermediary device, followed by a step 550 of providing the view of the file system exposed on the intermediary device via the user interface.

Figure 6:
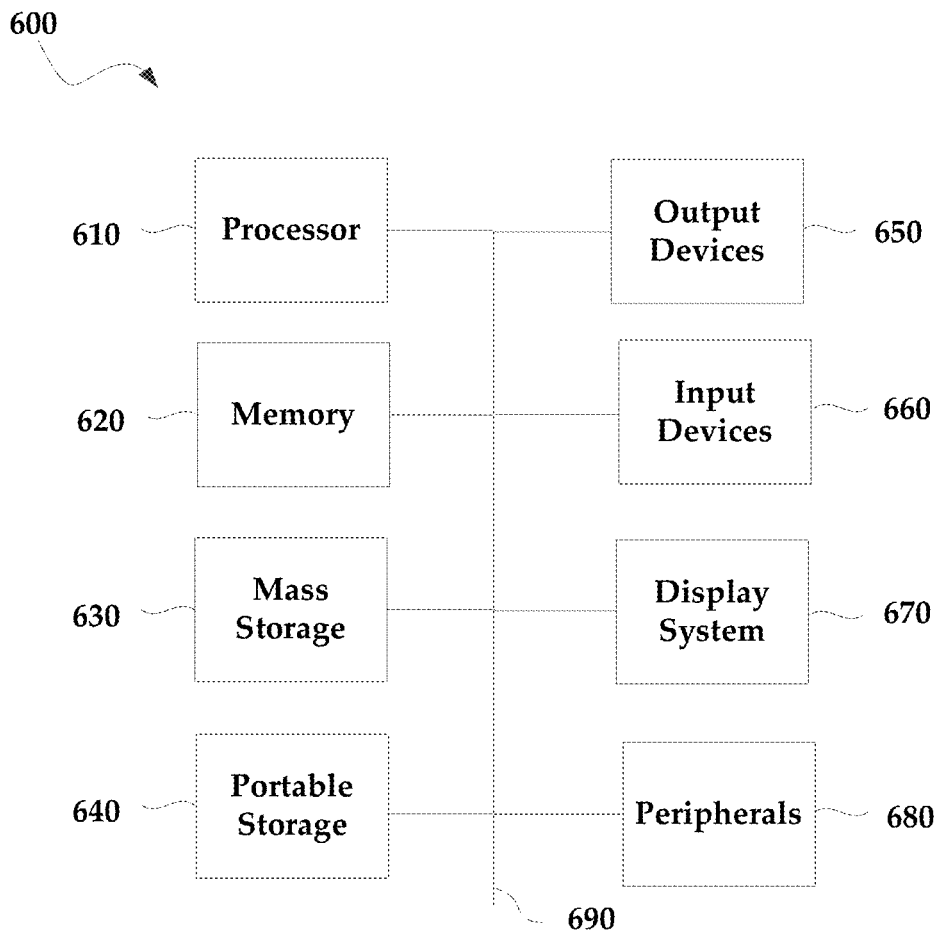
FIG. 6 illustrates an exemplary computing system that may be used to implement embodiments according to the present technology.

FIG. 6 is a block diagram of an exemplary computing device. The computing device of FIG. 6 may be used to implement computing device, web server, application server and third party web server. The computing system 600 includes one or more processors 610 and main memory 620. Main memory 620 stores, in part, instructions and data for execution by processor 610. Main memory 620 can store the executable code when in operation. The computing system 600 further includes a mass storage device 630, portable storage medium drive(s) 640, output devices 650, user input devices 660, a graphics display 670, and peripheral device(s) 680.

The components shown in FIG. 6 are depicted as being connected via a single bus 690. The components may be connected through one or more data transport means. The processor 610 and the main memory 620 may be connected via a local microprocessor bus, and the mass storage device 630, the peripheral devices 680, the portable storage medium drive(s) 640, and display system 670 may be connected via one or more input/output (I/O) buses.

The mass storage device 630, which may be implemented with a magnetic disk drive or an optical disk drive, is a non-volatile storage device for storing data and instructions for use by the processor 610. The mass storage device 630 can store the system software for implementing embodiments of the present technology for purposes of loading that software into the main memory 620.

The portable storage device 640 operates in conjunction with a portable non-volatile storage medium, such as a floppy disk, compact disk, digital video disc, or USB storage device, to input and output data and code to and from the computer system 600 of FIG. 6. The system software for implementing embodiments of the present technology may be stored on such a portable medium and input to the computer system 600 via the portable storage device 640.

The input devices 660 provide a portion of a user interface. The input devices 660 may include an alpha-numeric keypad, such as a keyboard, for inputting alpha-numeric and other information, or a pointing device, such as a mouse, a trackball, stylus, or cursor direction keys. Additionally, the computing system 600 as shown in FIG. 6 includes the output devices 650. Suitable output devices include speakers, printers, network interfaces, and monitors.

The display system 670 may include a liquid crystal display (LCD) or other suitable display device. The display system 670 receives textual and graphical information, and processes the information for output to the display device.

The peripheral device(s) 680 may include any type of computer support device to add additional functionality to the computer system. The peripheral device(s) 680 may include a modem or a router.

The components associated with the computer system 600 of FIG. 6 are those typically found in computer systems that may be suitable for use with embodiments of the present technology and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method for synthesizing a view of at least a portion of a file system backup, the method comprising:
    receiving a request to obtain a view of at least a portion of a file system backup for a device;
    providing a selectable list of devices for which file system backups may be viewed; and
    mounting one or more backup files associated with a device selected from the selectable list, on a backup node to:
       generate a view of the at least a portion of a file system created from the one or more mounted backup files; and
       expose the view to an intermediary node that is communicatively coupled with the backup node.

2. The method according to claim 1, wherein the one or more backup files includes at least one of: (i) one or more snapshots and (ii) one or more incremental files.

3. The method according to claim 2, wherein the one or more incremental files includes at least one reverse incremental delta increment.

4. The method according to claim 1, wherein the intermediary node and the backup node are communicatively coupled using a secure connection.

5. The method according to claim 1, wherein the view is generated from the one or more backup files using a userspace file system simulation emulation (UFSE) module.

6. The method according to claim 1, further comprising authenticating a client node and providing the view to the client node.

7. The method according to claim 1, wherein the view includes a directory tree of the file system at an arbitrary point in time.

8. The method according to claim 1, further comprising storing the view of the at least a portion of a file system in cache memory of the backup node.

9. The method according to claim 8, further comprising searching the cache memory for a view of the at least a portion of a file system before generating a view.

10. The method according to claim 1, further comprising generating a payload view that includes metadata associated with any of the device, backup preferences, the file system, a block of data within the file system, and combinations thereof.

11. A system for providing a graphical user interface, the system comprising:
    a backup node that comprises:
       a memory for storing executable instructions that synthesize a view of at least a portion of a file system backup;
       a processor that executes the instructions;
       a communications module that receives a request to view a representation of at least a portion of a file system backup for a device at an arbitrary point in time;
       a view generator that:
          provides a selectable list of devices for which file system backups may be viewed;
          mounts one or more backup files associated with a device selected from the selectable list; and
          generates a view of the at least a portion of a file system created from the one or more mounted backup files; and
    an intermediary node communicatively coupled with the backup node, the intermediary node providing, to a network browser, a user interface that includes the view.

12. The system according to claim 11, wherein the one or more backup files includes one or more snapshots and one or more incremental files.

13. The system according to claim 12, wherein the one or more incremental files includes at least one reverse incremental delta increment.

14. The system according to claim 11, wherein the intermediary node and the backup node are communicatively coupled using a secure protocol.

15. The system according to claim 11, wherein the backup node comprises a userspace file system simulation emulation (UFSE) module that generates the view from the one or more backup files.

16. The system according to claim 11, wherein the intermediary node authenticates an end user utilizing the network browser before the intermediary node provides the user interface to the client node.

17. The system according to claim 11, wherein the view includes a directory tree of the file system at the arbitrary point in time.

18. The system according to claim 11, wherein the backup node further comprises a cache management module that stores the view of the at least a portion of a file system in cache memory associated with the backup node.

19. The system according to claim 18, wherein the cache management module searches the cache memory for a view of the at least a portion of a file system before the view generator generates the view.

20. A non-transitory computer readable storage media having a program embodied thereon, the program being executable by a processor to perform a method for synthesizing a representation of at least a portion of a file system backup, the method comprising:

receiving a request to view a representation of at least a portion of a file system backup for a device at an arbitrary point in time;

providing a selectable list of devices for which file system backups may be viewed;

mounting one or more backup files associated with a device selected from the selectable list, on a backup node; and generating a view of the at least a portion of a file system created from the one or more mounted backup files, the view being accessible via an intermediary node that is communicatively coupled with the backup node.

21. A method for generating a view of a file system backup, the method comprising:

authenticating an end user via credentials received via a user interface;

providing a selectable list of devices for which file system backups may be viewed;

receiving a device identification for a device, the device being included in the selectable list;

locating restore points for the device and providing indications of the restore points via the user interface;

receiving selections of one or more restore points via the user interface;

mounting the one or more restore points on a backup node to generate a view of a file system;

exposing the view of the file system to an intermediary device; and providing the view of the file system exposed on the intermediary device via the user interface.

22. The method according to claim 21, wherein the view includes a navigable file system that behaves like a local file system.

* * * * *